Aug. 14, 1956  R. N. FOSS  2,759,055
TUBE TESTING APPARATUS
Filed July 22, 1953
FIG. 1.
FIG. 2.
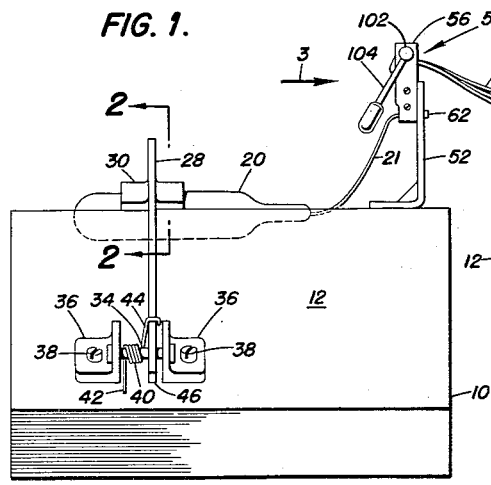
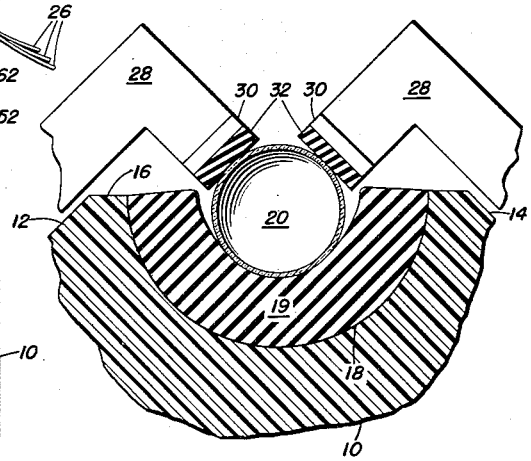
FIG. 3.
FIG. 4.
INVENTOR.
RENÉ N. FOSS
BY
ATTORNEYS

United States Patent Office 2,759,055
Patented Aug. 14, 1956

2,759,055

TUBE TESTING APPARATUS

Rene N. Foss, Seattle, Wash., assignor to the United States of America as represented by the Secretary of the Navy Application July 22, 1953, Serial No. 369,646

2 Claims. (Cl. 200—51.04)

This invention relates to tube testing apparatus and more particularly to apparatus that can be used with test circuits for accurately measuring the level of microphonic noise developed in miniature electron tubes having wire leads, to determine the acceptability of the tubes for certain applications.

When an electron tube is subjected to shock or vibration, the tube elements are slightly displaced, thereby giving rise to undesired signals characterized by the term microphonic noise. Electron tubes are widely used in installations in which they are subjected to mechanical shock and vibration. In some of these applications, for example, influence fuze circuits of the types used in missiles, torpedoes, projectiles and the like, operation is initiated by a voltage of predetermined amplitude appearing at the grid of an electron tube. It is necessary that the spurious peak voltages due to any microphonic action in the tube remain below the firing level voltage, to avoid premature actuation of the fuze when the target is not in the destructive zone. This problem is different from that of microphonics of tubes used in communication circuits, inasmuch as the latter require only that the noise signal be held to a small value of the intelligence signal. It is, therefore, necessary that the microphonic action of electron tubes for use in fuze circuits be accurately determined before the tube is used.

Because the space available for fuze circuits is limited, miniature tubes having wire leads are used. While clip connectors and the like can be used for the ordinary electrical tests of these tubes, firm connections are required when the tubes are tested by being subjected to mechanical shock and vibration, to avoid noise generated by loose connections. In addition, for quantity testing, it is necessary that firm connections be made quickly.

Sudden mechanical shock rather than steady vibrations is regarded as the most probable source of microphonic noise. Furthermore, inasmuch as a vibrational mode of the tube elements may not be excited if the impulse is applied in a given plane, reliability of the test results requires that the shock be applied to the tube from several directions. It is desirable that the test impulses be reproducible so that a test can be repeated, and also so that the test conditions can be made uniform for all the tubes tested. Another requirement for apparatus of this type is that the test conditions approximate the actual operating conditions of the electron tubes as nearly as possible.

It is a general object of this invention to provide an improved apparatus for determining the effect of mechanical shock and vibration on the operation of electron tubes having wire leads.

It is a further object of this invention to provide an improved holder for use in testing miniature tubes having wire leads.

Another object of the invention is the provision of a tube holder, for use in microphonics testing of miniature tubes having wire leads, by means of which firm connections may be made quickly and easily between the wire leads and the test circuits.

It is still a further object of this invention to provide an improved apparatus for testing electron tubes for microphonic noise in which mechanical impulses can be applied to the tubes from more than one direction.

An additional object of the invention is to provide an improved apparatus for applying reproducible mechanical impulses to electron tubes for microphonics testing of said tubes.

Briefly, the foregoing and other objects are accomplished by the provision of a tube holder having a resilient bed to receive a miniature tube having wire leads. A pair of spring driven hammers arranged to strike the tube, at points approximately at right angles to each other, are employed to apply mechanical impulses to the tube. The wire leads of the tube are received in suitable apertures provided adjacent the tube holder and are adapted to be contacted by a plurality of individual pins which can be moved in a single operation into contact with the wire leads. The pins are connected to circuits suitable for test purposes.

Other objects and many of the attendant advantages of this invention will become evident from the following detailed description, taken in conjunction with the accompanying drawing, wherein:

Fig. 1 is a side elevation of the apparatus of the present invention;

Fig. 2 is an enlarged partial section on line 2—2 of Fig. 1;

Fig. 3 is an elevation of the tube lead clamping mechanism, also on an enlarged scale, looking in the direction of the single arrow 3 in Fig. 1, with some parts being broken away; and Fig. 4 is a section along line 4—4 of Fig. 3.

Referring to the drawing, the invention is shown as comprising as base 10 which may be of plastic or any material suitable for mounting the other parts of the apparatus. The base 10 has sloping sides 12 and 14 and is provided on its top surface 16 with a semi-circular recess 18 which is lined with foam rubber to provide a bed 19. An electron tube 20 of the type that is provided with a plurality of wire leads 21, 22, 23, 24 and 25, for connection to the external circuits 26, is laid on the foam rubber bed 19 in the recess 18. A hammer 28 is pivotally mounted on each of the sloping sides 12 and 14 of the block 10. The hammers 28 are mounted in this manner to contact the tube 20 under test in different planes, for reasons explained hereinbefore. The ends 30 of the hammers 28 are relatively blunt and are covered with strips of foam rubber 32 to avoid the possibility of mechanical injury to the tube.

The pivotal mounting for each hammer 28 includes a shaft 34 that is received in apertures provided in a pair of spaced mounting brackets 36 which are attached to the sloping sides 12 and 14 of the base 10 by screws 38. A helical spring 40 carried on shaft 34 has one end 42 arranged to contact the sloping side of the block and its other end 44 hooked over the hammer 28. The spring normally holds the hammer down against the block 10 or in contact with the tube 20. The hammer 28 can be manually pulled back until the stop 46 provided at the end thereof comes into contact with a sloping surface of the block 10.

The means for quickly making firm connections between the individual wire tube leads 21, 22, 23, 24 and 25 and the proper leads 26 of external testing apparatus circuitry is generally indicated by the reference numeral 50 and is shown in detail in Figs. 3 and 4. The means, indicated generally at 50 is supported above the base by an L-shaped bracket 52 which has a pair of spaced arms 54 and 56 attached thereto. A block 58 of insulating material is held in place between the spaced arms 54 and 56 by means of screws 59. The lower portion of the block 58 is provided with a plurality of spaced apertures 60 into which sleeves 62 having flared ends 64 are snugly fitted. The sleeves 62 extend through apertures 65 in the upright portion of the L-shaped bracket 52, and are themselves apertured at 66 for a purpose that will become clear hereinafter. The ends of the wire leads 21, 22, 23, 24 and 25 are individually inserted into the sleeves 62.

The block 58 is provided with a pair of spaced guideways 68 of suitable shape and size to receive spaced rods 70 carried on a bar 72 of insulating material which is mounted to move vertically with respect to the block 58. The rods 70 are threaded at 74 and each rod has a flange 76 thereon. The threaded ends of the rods are inserted through apertures 78 provided in the bar 72, and nuts 80 screwed on said threaded ends serve to retain said rods in place on the bar 72.

A plurality of spring loaded contact pins 82 are slidably carried in a corresponding number of apertures 84 in the bar 72. Each aperture 84 is provided with a metallic sleeve 86 having a flange 88. The contact pins 82 project into recesses 90 in the block 58 and have their corresponding lower ends slidably engaged in openings 91 which communicate between the bottoms of said recesses and the openings 66 in the sleeves 62. A shoulder 92 is provided on each contact pin 82, and a helical expansion spring 94 is interposed between the shoulder 92 and the flange 88 thereby spring loading the contact pins 82 in a direction away from the bar 72. Connections are made between the wires 26 of the external circuit and the contact pins 82 by the individual wires being engaged between nuts 95 which are screwed on the upper ends of the contact pins 82.

The contact pins 82 are moved into engagement with the wire tube leads by a mechanism including the shaft 100 which is rotatably carried in apertures provided in the spaced arms 54 and 56. One end of the shaft 100 is provided with an enlarged head 102 to which a handle 104 is attached so that the shaft can be easily rocked. The other end of the shaft carries a nut 106 which prevents the shaft from any appreciable lateral motion with respect to the arms 54 and 56. A pair of spaced cams 108 are mounted on the shaft so as to rock therewith. The cams 108 contact spaced bearing surfaces 110 on the bar 72 to move the bar downwardly, thereby causing the ends 111 of the spring loaded contact pins 82 to engage the wire leads 21, 22, 23, 24 and 25. The shape of the cams 108 is such that when the bar 72 is in its lowermost position the contact pins are urged against the wire leads with a force of considerable magnitude so that a connection is made which is so firm that it will not be altered by the mechanical forces acting on the tube being tested for microphonic noise or by other external forces.

In practice, the tube under test is connected in an external circuit similar to that in which it is to be used. No signal is applied to the grid; it is terminated in an impedance approximately equal to that encountered in actual use. Mechanical impulses are applied to the tube by the hammers 28. The tube output is fed, through the circuit approximating the actual circuit with which it is to be used, to a cathode ray oscilloscope having a long persistence screen. When struck by the hammers 28, the tube will provide a transient voltage which in turn will cause a deflection on the screen. The peaks of the several deflections are the measure of microphonic noise. If the peak voltage thus determined exceeds a predetermined value that depends on the fuze firing level and a safety factor, the tube is, of course, unsuitable for use.

While the holder has been described in connection with the testing of electron tubes, it is pointed out that it can be used to test other electrical components.

Obviously many other modifications and variations of the present invention are possible in the light of the above teachings. It is therefore to be understood that within the scope of the appended claims the invention may be practiced otherwise than as specifically described.

What is claimed is:

1. A quick acting temporary connector-disconnector apparatus for microphonics testing of electron tubes having wire leads, comprising, resilient means for supporting a tube, a block mounted adjacent the means for supporting said tube, said block being provided with means for individually receiving said wire leads, a bar mounted for motion with respect to said block, a plurality of spring loaded contacts carried on said bar, a cam rockably mounted and having its surface in contact with said bar, and means for rocking said cam to move said contacts into circuit closing relationship with said wire leads.

2. A quick acting temporary connector-disconnector apparatus for microphonics testing of electron tubes having wire leads, comprising, resilient means for supporting a tube, a block mounted adjacent said means for supporting said tube, said block being provided with apertures for individually receiving said wire leads, said block also being provided with recesses communicating with said apertures, a bar mounted for motion with respect to said block, a plurality of spring loaded contacts carried on said bar and arranged for movement in said recesses, a cam rockably mounted adjacent said bar and having its surface in contact with said bar, and means for rocking said cam to move said contacts into circuit closing relationship with said wire leads.

References Cited in the file of this patent
UNITED STATES PATENTS

| | | |
|---|---|---|
| 2,158,630 | Lloyd | May 16, 1939 |
| 2,418,437 | Vogt | Apr. 1, 1947 |
| 2,420,055 | Sanders | May 6, 1947 |
| 2,476,297 | Harris | July 19, 1949 |
| 2,696,535 | McLean et al. | Dec. 7, 1954 |